Oct. 4, 1955
E. H. WELLER
2,719,754
SPRAY UNIT
Filed July 29, 1953
2 Sheets-Sheet 1
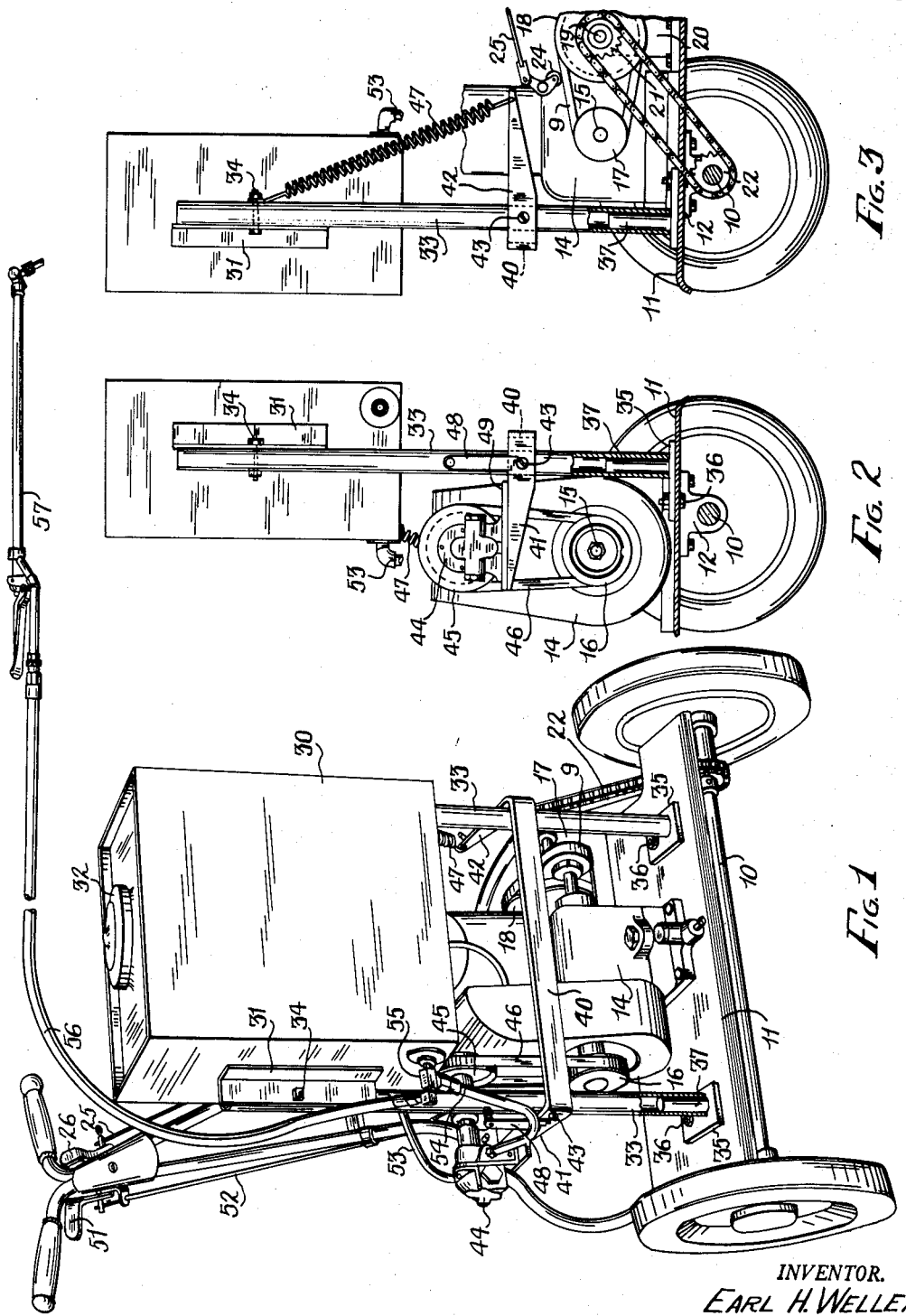
INVENTOR.
EARL H. WELLER
BY Hudson, Boughton,
Williams, David & Hoffmann
ATTORNEYS Oct. 4, 1955  E. H. WELLER  2,719,754
SPRAY UNIT
Filed July 29, 1953  2 Sheets-Sheet 2

INVENTOR.
EARL H. WELLER
BY Hudson, Boughton,
Williams, Davis & Hoffmann
ATTORNEYS

# United States Patent Office 2,719,754
Patented Oct. 4, 1955

2,719,754
SPRAY UNIT

Earl H. Weller, Bay Village, Ohio, assignor to Leonard M. Strunk, Coatesville, Pa.

Application July 29, 1953, Serial No. 370,958

5 Claims. (Cl. 299—97)

This invention relates to improvements in a spray unit, more particularly a spray unit which is adapted to be removably mounted upon a suitable support, such as a wheeled truck having power means for driving the truck, which power means is utilized also for operating the spray.

One of the objects of the invention is the provision of a removable spray unit which may be quickly and easily attached to the truck and removed therefrom when the truck is to be used for purposes other than spraying.

Another object of the invention is the provision of resilient means anchored to the frame of the removable unit for pulling the spray pump upwardly to tauten the belt drive thereof, which resilient means acts also to bias the frame downwardly toward the supporting truck.

Another object is the provision of means for latching the pump downwardly against the influence of the spring which tautens the belt in order to disable the spray pump, which is advantageous when the motor is being used for purposes other than spraying, including propelling the truck.

Other objects and features of novelty will appear as I proceed with the description of those embodiments of the invention which, for the purposes of the present application, I have illustrated in the accompanying drawings, in which:

Fig. 1 is a perspective view of a power driven truck with my removable spray unit in position thereon and operatively connected with the truck motor;

Fig. 2 is a fragmental side view partly in vertical section looking from the left side of Fig. 1, showing the spray pump mounting and drive;

Fig. 3 is a fragmental side view looking at the right side of Fig. 2, showing the truck drive diagrammatically;

Figure 6:
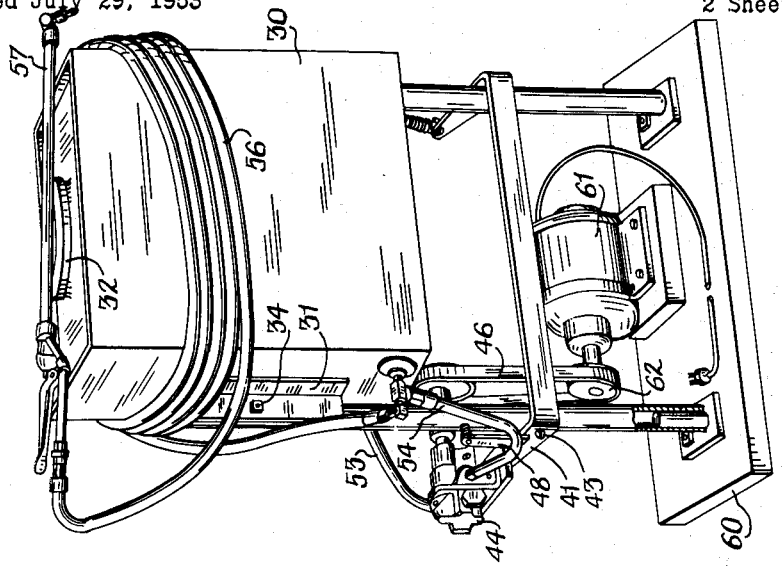
Fig. 6 is a perspective view of the unit mounted on a base to which an electric motor is attached.

In the drawings there is illustrated a wheeled truck which may be used in connection with the invention, this truck having a live axle 10 and a shelf 11 with a flat upper surface, this shelf being provided with a pair of pillow blocks 12 by means of which the axle is rotatably carried. The truck may be power driven and may be of the simple form indicated in the drawing or it may be a part of some machine such as a lawnmower, snow plough, or the like.

Carried by and fixed to the shelf 11 there is an internal combustion engine 14 having a crankshaft 15 provided near one end with a pulley 16 and at the other end with a pulley 17. Pulley 17 by means of a belt 9 drives a second pulley 18 on a shaft 19 which is journaled in a bracket 20 attached to shelf 11. On the shaft 19 there is also mounted a sprocket wheel 21 over which runs a chain 22 that drives a sprocket wheel 23 keyed to axle 10. Belt 9 is in slipping relation with one or both of pulleys 17 and 18 except when a belt tightener 24 is actuated by a pull cable 25 that extends to a lever 26 on the handle of the truck. Obviously, when the tightener cable 25 is pulled driving force will be transmitted from the motor 14 to the axle 10 and the truck wheels will be driven to cause the truck to travel over the ground or other supporting surface.

Now, referring more particularly to the removable spray unit constituting the present invention, this unit comprises a tank 30 for liquid spray material provided with angle bars 31 welded to the sides of the tank, and with a filler opening at the top closed with an airtight cap 32. Tubular side posts 33 are disposed in the angles between the tank and the angle bars 31, and are joined to the outstanding flanges of the angle bars by bolts 34, so that the posts and the tank are joined together to constitute a rigid frame.

On the shelf 11 I mount two metal plates 35 by means of bolts 36 extending through the shelf. On each of the plates 35 spaced forwardly from the bolt there is a pin 37 which is welded or otherwise rigidly fixed in or onto the plate, these pins being of a size to fit snugly within the tubular posts 33. This mounting for the pins is used in order that their attachment to the shelf may be effected without tools other than a drill for making the holes through the shelf and a wrench for tightening the bolts. This method of mounting also compensates for any inaccuracy in positioning the bolt holes, since the plates may be swung through a small angle to exactly register with the posts 33 and then the bolts may be tightened to fix the pins in that location.

40 is a metal bar which extends across and slightly in advance of the two posts 33. It has two rearwardly extending arms 41 and 42 which are pivotally mounted on aligned screws 43 threaded into the posts. On the arm 41 there is mounted a rotary liquid pump 44 of any suitable character, to the shaft of which is pinned a pulley 45 disposed in the same vertical plane with pulley 16 on the engine shaft. A drive belt 46 extends over these two pulleys for communicating driving force to the pump. To the free end of arm 42 there is attached a tensile spring 47 that extends upwardly and is attached to the adjacent post 33 as by means of the bolt 34 therein. The spring working through the arm 42, the bar 40, and the arm 41 exerts an upward pressure on the pump 44, which has a double function. It takes up slack in the belt 46 so that the pump is positively driven. It also results in a reaction against the pulley 16, the axis of which is fixed, through the belt 46, the upper pulley 45, the arm 41, the bar 40 and arm 42 through the screws 43 to force the posts 33 downward and bias the whole frame downwardly against shelf 11.

When it is desirable to interrupt drive to the pump 44 during operation of the engine 14, whether or not the axle 10 is being driven by the engine, the arms 41 and 42 should be tilted downwardly to put slack into the belt 46 and permit it to slip on one or the other of pulleys 16 and 45 and then latch it in this downwardly tilted position. For the latter purpose I mount a swingable latch finger 48, depending from a pin on one of the posts 33, the lower extremity of this finger being provided with stepped notches one of which can be engaged with an edge 49 of the pump base.

Figure 5:
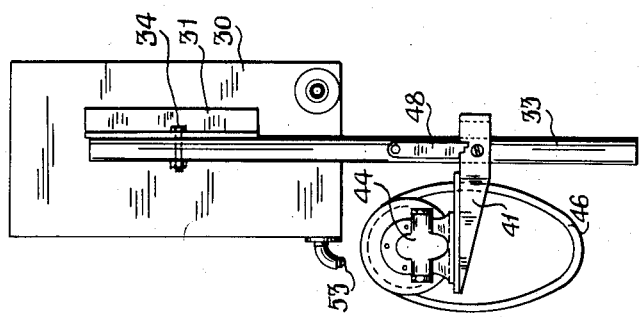
Fig. 5 is a side view of the same.
Figure 4:
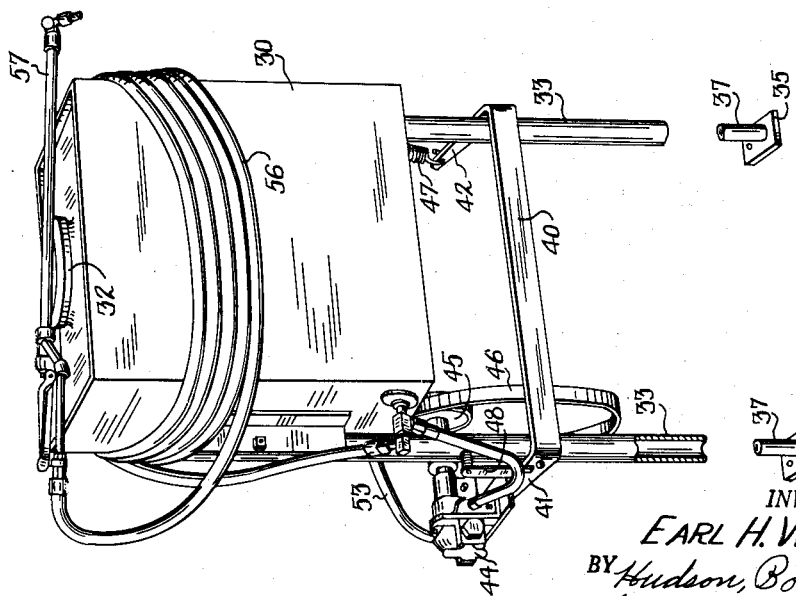
Fig. 4 is a perspective view of the spray unit detached.

To remove the spray unit from the truck it is necessary only to tilt the arm 41 downwardly and slip belt 46 off pulley 16, after which the unit may be lifted away from the truck, the posts 33 sliding off the pins 37 to make the unit entirely free, as indicated in Figs. 4 and 5. The reverse operation puts the unit in place.

When the unit is installed upon a wheeled truck as illustrated in Figs. 1, 2 and 3, a lever 51 may be provided upon the handle of the machine for operating a throttle control rod 52 by means of which the speed of the engine may be varied, either for varying the speed of travel of the truck or for varying the force of the spray. A hose connection 53 extends from the bottom of the tank to pump 44 and from the delivery side of the pump a hose connection 54 extends to a fitting 55 from which a hose 56 leads to a spray wand 57 of usual form. Fitting 55 is mounted in the tank and may have provision for directing a portion of the liquid delivered by the pump into the tank for the purpose of agitating the solution therein.

From the foregoing it will be clear that the motor driven truck may be used for various purposes at different times without the spray unit and that the latter may be readily and quickly mounted on the truck and connected with the motor when it is desired to perform a spraying operation after which the unit may be quickly removed and stored until required another time.

In Fig. 6 I have shown a somewhat different application of the spray unit. In this case the unit is mounted upon a flat base 60 which carries an electric motor 61 having a pulley 62 on its rotor shaft for driving the belt 46 of the unit in the same manner and for the same purpose as the internal combustion engine 14 of the first described form of the invention. In this application of the invention the spray unit and base may be set down in a position centrally of the area to be sprayed and the motor cord plugged into a convenient outlet. The hose 65 may be relatively long so that the operator may move to some distance from the unit as he operates the spray, the wand 57 having a suitable control valve as is common in the art.

Having thus described my invention, I claim:

1. In combination with a wheeled truck, a prime mover mounted upon and secured thereto, driving mechanism for said truck operatively connected to said prime mover, means for disabling said driving mechanism, said prime mover having a drive pulley in a vertical plane, a frame comprising a pair of vertical hollow posts, a tank for liquid carried by said posts, upright pins secured to said truck over which said hollow posts are adapted to fit for removably mounting the frame on the truck, a liquid pump carried by said frame having a pulley above and in the same plane with said drive pulley, an endless belt running over said pulleys, a bar pivotally mounted on said posts to tilt upon a transverse axis parallel to the plane of said posts, an arm at one end of said bar projecting therefrom at a right angle, said pump being supported upon said arm, a spring anchored to said frame for tilting said arm upwardly about the transverse pivotal axis of said bar, whereby the slack in said belt is taken up and said frame is biased downwardly toward said truck, and means for latching said arm in a downwardly tilted direction, whereby the drive to said pump may be disabled without affecting the driving mechanism for the truck.

2. In a spray unit, the combination comprising a support, a prime mover mounted on said support and anchored thereto, an assembly including a frame mounted on said support, a pump mounted for movement relative to said support and frame, and means operative to bias said pump away from said prime mover and to simultaneously bias said frame toward said support to secure the same against displacement, and endless belt means operatively connecting said prime mover and pump and effectively tautened by said biasing means, said assembly being quick detachably secured to said support and being separable therefrom as a unit when said belt is dismounted.

3. In a spray unit, the combination comprising a support, a prime mover mounted on said support and anchored thereto, an assembly including a frame mounted upright on said support in advance of said prime mover, a pump mounted for swinging movement relative to said support and frame and positioned above the former and to the rear of the latter, and tension spring means operatively interposed between said frame and pump and operative to bias said pump away from said prime mover and to simultaneously bias said frame toward said support to secure the same against displacement, and endless belt means operatively connecting said prime mover and pump and effectively tautened by said tension spring means, said assembly being quick detachably secured to said support through the medium of a slip joint type connection between said support and frame and being separable from said support as a unit when said belt is dismounted.

4. In a spray unit, the combination comprising a support, a prime mover mounted on said support and anchored thereto, an assembly including a frame mounted upright on said support in advance of said prime mover, a member mounted on said frame for swinging movement relative to said support and frame and positioned above the former and extending rearwardly from the latter, a pump mounted on said member for movement therewith, and a coil spring connected to said frame and member and operative to bias said pump away from said prime mover and to simultaneously bias said frame toward said support to secure the same against displacement, and an endless belt operatively connecting said prime mover and pump and effectively tautened by said coil spring, said assembly being quick detachably secured to said support through the medium of a pin and socket slip joint type connection between said support and frame and being separable from said support as a unit when said belt is dismounted.

5. In a spray unit, the combination comprising a support, a prime mover mounted on said support and anchored thereto, an assembly including a frame mounted upright on said support in advance of said prime mover and adapted to carry a tank, a member pivotally connected to said frame for swinging movement relative to said support and frame and positioned above the former and extending rearwardly from the latter, a pump mounted on said member for movement therewith, and a coil spring connected to said frame and member at points respectively above and to the rear of the pivotal connection between said frame and member and operative to bias said pump away from said prime mover and to simultaneously bias said frame toward said support to secure the same against displacement, and an endless belt operatively connecting said prime mover and pump and effectively tautened by said coil spring, said assembly being quick detachably secured to said support through the medium of a pin and socket slip joint type connection between said support and frame and being separable from said support as a unit when said belt is dismounted.

References Cited in the file of this patent

UNITED STATES PATENTS

| | | |
|---|---|---|
| 2,168,821 | Elliott | Aug. 8, 1939 |
| 2,243,610 | Spreng | May 27, 1941 |